Aug. 18, 1925. 1,550,291
J. R. STULL ET AL
TRACTOR CULTIVATOR
Filed Aug. 16, 1919 2 Sheets—Sheet 1
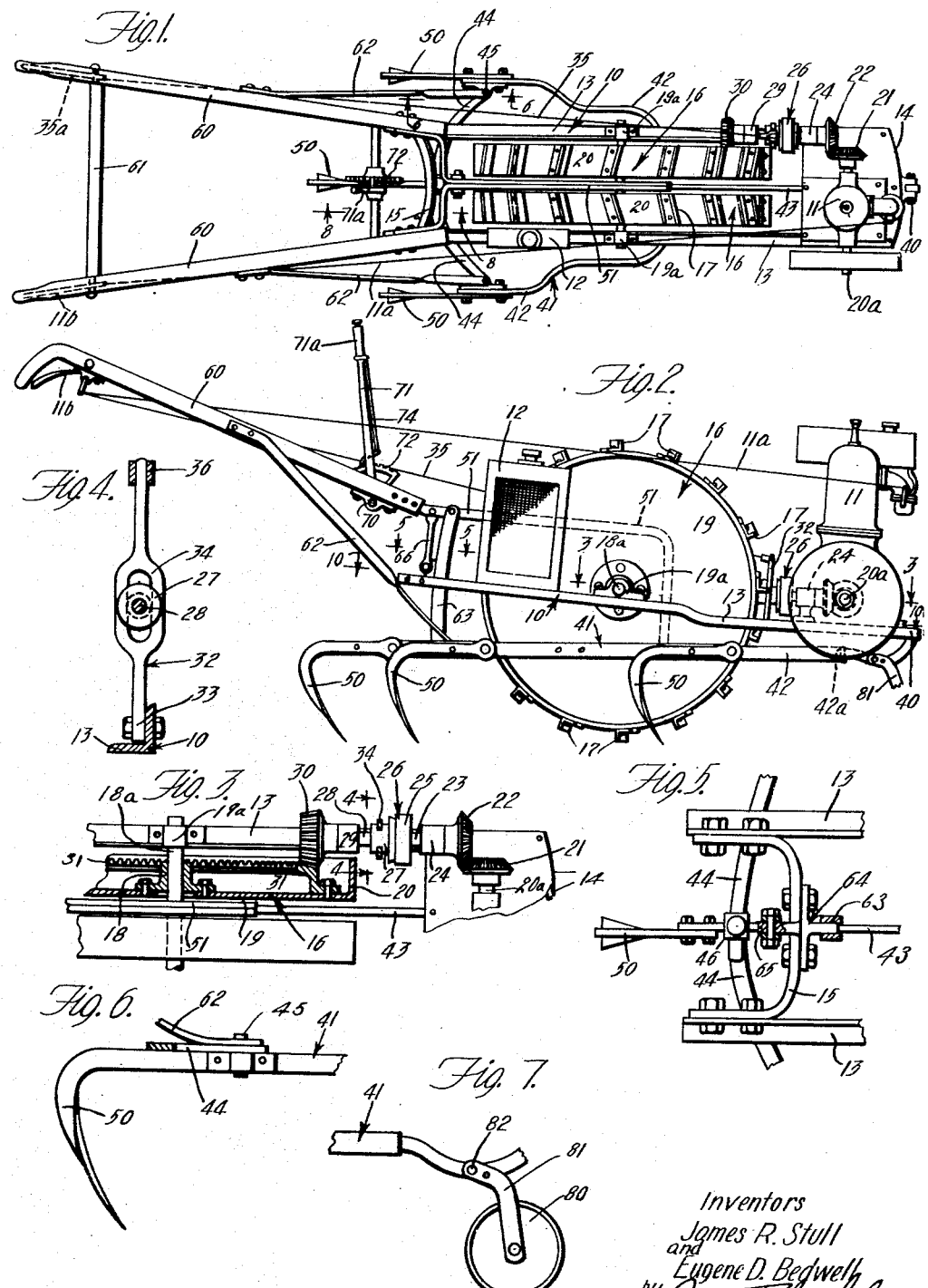
Inventors
James R. Stull
and
Eugene D. Bedwell
by
Their Attorney.

Aug. 18, 1925.

J. R. STULL ET AL 1,550,291

TRACTOR CULTIVATOR

Filed Aug. 16, 1919

2 Sheets—Sheet 2

Inventors
James R. Stull
and
Eugene D. Bedwell by
their Attorney

Patented Aug. 18, 1925.

1,550,291

UNITED STATES PATENT OFFICE.

JAMES R. STULL AND EUGENE D. BEDWELL, OF LOS ANGELES, CALIFORNIA.

TRACTOR CULTIVATOR.

Application filed August 16, 1919. Serial No. 317,929.

*To all whom it may concern:*

Be it known that we, JAMES R. STULL and EUGENE D. BEDWELL, citizens of the United States, both residing at Los Angeles, in the county of Los Angeles, State of California, have jointly invented new and useful Improvements in Tractor Cultivators, of which the following is a specification.

This invention relates to tractor cultivators and particularly to tractor cultivators adapted to be used for light work in truck gardens and the like. An object of the invention is to provide a device of this character which is simple and effective, and which will thoroughly work the soil, although of exceptionally small weight.

It is an object of the invention to provide a tractor cultivator which will be particularly effective, that is, a machine which will have exceptionally great tractive power in proportion to its weight. Due to the great tractive power of the machine a small light machine may be used to do the work heretofore done by heavy unwieldy machines. The lightness of the machine is an important feature as it makes it possible for a man to operate a larger machine than he has heretofore been able to handle. The ultimate result of this feature of the machine is a saving in the cost of cultivating due to the saving in cost of the machine, and effort and time in handling it.

A further feature of the invention is the arrangement and construction which causes the machine to practically balance on the driving wheels thereby concentrating the weight on said wheels. The concentrated weight of the machine on the driving wheels combined with a "digging in" effect obtained by using suitably shaped cultivator teeth causes the driving wheels to be pressed firmly against the ground thereby giving them great traction.

The adjustability of the machine also is an important feature as it is possible to adjust the machine to cultivate to any desired depth (within the limit of the machine). The adjustability of the machine is a very desirable feature as it allows the machine to be readily used for various kinds of cultivating.

Further objects and features of the invention will be clearly understood from the following detailed description, of a preferred embodiment of the invention, throughout which reference is had to the accompanying drawings, in which—

Figure 8:
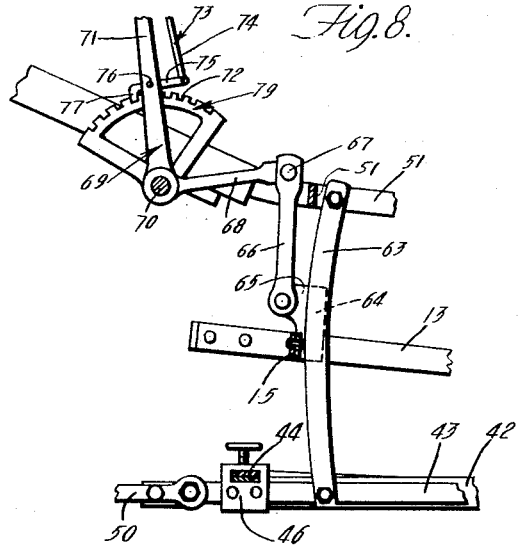
Figure 9:
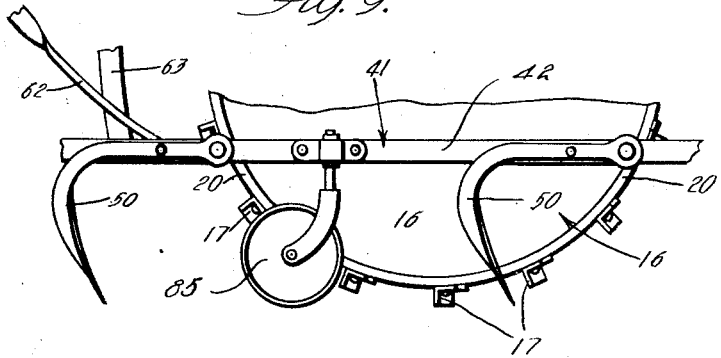
Figure 10:
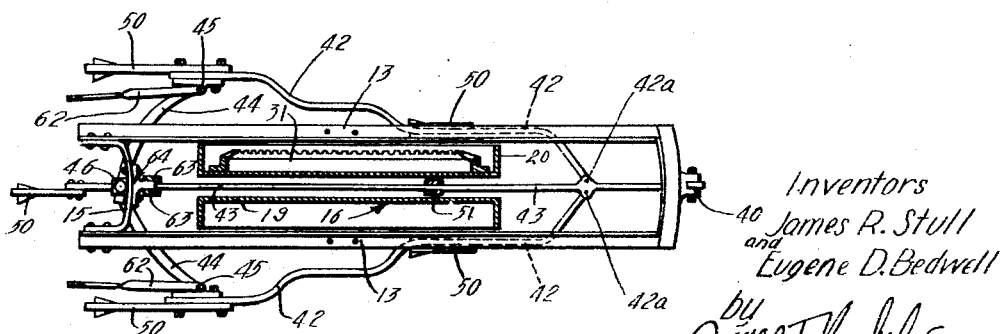

Fig. 1 is a plan view of the machine; Fig. 2 is a side elevation of the machine; Fig. 3 is an enlarged detail section taken as indicated by line 3—3 on Fig. 2; Fig. 4 is a detail section taken as indicated by line 4—4 on Fig. 3; Fig. 5 is an enlarged section taken as indicated by line 5—5 on Fig. 2; Fig. 6 is an enlarged section taken as indicated by line 6—6 on Fig. 1; Fig. 7 is a side elevation showing the pilot wheel; Fig. 8 is an enlarged section taken as indicated by line 8—8 on Fig. 1; Fig. 9 is a side elevation of a portion of the machine showing side wheels in connection with the machine: and Fig. 10 is a sectional view taken as indicated by line 10—10 on Fig. 2.

Throughout the drawings numeral 10 designates the upper frame of the machine on the forward end of which is mounted the engine 11. The engine 11 is preferably an ordinary one cylinder internal combustion engine and is suitably connected with a radiator 12 which is also mounted on the upper frame 10. The frame 10 is rigid and is rectangular in shape. Frame 10 comprises side members 13, a forward end member 14 and a rear end member 15. Two driving wheels 16 are suitably mounted in the frame 10. The driving wheels 16 preferably comprise hub casting 18 to which are connected circular disks 19 which have tread flanges 20 extending from their peripheries The outer surfaces of the flanges 20 form the tread faces of the wheels on which are mounted traction cleats 17. The driving wheels 16 are rigidly mounted a short distance apart on a shaft $18^a$. The shaft $18^a$ is carried in suitable bearings $19^a$ which are mounted on the side members 13 of frame 10. The engine 11 is set on the frame 10 so that the engine shaft $20^a$ is transverse of the frame. The engine shaft $20^a$ has mounted on it a bevel pinion 21. The bevel pinion 21 engages and drives a bevel gear 22 which is mounted on one end of a shaft 23 carried in a bearing 24. Mounted on the other end of the shaft 23 is a clutch member 25 of a clutch mechanism 26. The clutch member 27 of the clutch mechanism 26 is slidably mounted on one end of a shaft 28 carried in a bearing 29. A bevel pinion 30 is mounted on the other end of shaft 28 and is in engagement with a ring gear 31 mounted on disk 19 of one of the driving wheels 16, as clearly shown in the drawings. The clutch member 27 is adapted to engage the clutch member 25 so as to cause shaft 28 to be driven by shaft 23. The clutch member 27 is adapted to be moved into engagement with or away from clutch member 25 by means of a lever 32. The lever 32 is pivotally mounted at 33 to one of the frame members 13 and has a yoke portion 34 which engages the clutch member 27. A control rod 35 is connected at 36 to the outer end of lever 32.

It will be readily understood how the engine 11 through the mechanism just described is adapted to drive both driving wheels 16. Although one particular driving arrangement has been described in connection with the engine 11 and the driving wheels 16 it will be readily understood that the invention is not limited to such an arrangement but that any suitable driving connection may be made between the engine and the driving wheels. It is preferred, however, that the driving connection between the engine 11 and the driving wheels 16 is such as to allow a comparatively small high speed engine to be used in order to drive the driving wheels 16 comparatively slowly.

Pivotally connected at 40 to the forward end of central bar 43 there is a lower cultivator frame 41. The lower frame 41 comprises side members 42 which extend inwardly at the forward end of the frame and adjustably pivotally connect at 42ª to a central bar 43 which extends longitudinally through the center of the frame 42 between the driving wheels 16. This central bar 43 bears the same relation to side bars 42 that the usual central bar in a cultivator bears to the rearwardly diverging side bars. The rear ends of these three bars are kept in adjustable spaced relation in the usual manner by spacer bars 44. Spacer bars 44 are pivotally connected at 45 to the side members 42 of the frame 41 and extend inwardly and are adjustably carried in a block 46 which is mounted near the rear end of central bar 43. This construction makes it possible to swing the side members 42 of the frame in or out and thereby vary the width of frame 41. Mounted on and extending downwardly from the frame 41 there are cultivator teeth 50. The cultivator teeth 50 are preferably shaped as clearly shown in Figs. 2 and 6 as this shape of tooth tends to dig in or bury itself in the ground. This digging in action of the teeth 50 when they are being pushed through the ground pulls the frame 41 toward the ground. Any suitable number of teeth 50 may be mounted on the frame 41 and said teeth may be arranged in any suitable manner. It is preferred that the teeth 50 be arranged mostly back of the driving wheels 16 so as to keep the machine in balance. It has been found in practice that placement of the teeth too far forward causes the machine to tip forward. It will be understood that the invention is not limited to the particular form of teeth shown in the drawings but that any suitable form of teeth may be used.

Attached to the central bar 43 at a point forward of the shaft 18 there are two flat bars 51. The bars 51 extend upwardly from the bar 43 and then rearwardly and substantially parallel with the bar 43 to the rear of the machine. The bars 51 are preferably bolted or riveted together except at the rear of the machine where they separate so as to form brackets to which the handles 60 may be attached. The handles 60 extend upwardly and rearwardly from the machine and are braced apart by rod 61. Braces 62 are also provided in connection with the handles, extending from the sides of the handles to the points 45 where the members 44 are pivotally connected to the frame members 42. The control rod 35 from the clutch operating lever 32 extends to one handle and is attached to a small bell crank 35ª which is mounted near the end of one of the handles 60. This arrangement provides a simple and effective control for the clutch mechanism 26. A control rod 11ª from the engine 11 extends to the other handle 60 and connects to a bell crank 11ᵇ as clearly shown in Fig. 2.

Attached to the sides of the bars 43 and 51 near the rear end of the machine there are vertical straps 63. The straps 63 are curved, with a radius the center of which is the pivotal connection 40, and are spaced apart by the thickness of the bars 51 and 43 so as to form a guide in which a slider 64 is carried. The central bar 43, the bars 51, the guide bars 63, the handles 60 and the brace rods 62 form a rigid frame structure at the forward end of which the rigid frame 10 is pivotally connected. The slider 64 is mounted on the rear cross member 15 of the upper frame 10 and has a lug 65 extending from it to which the lower end of a connecting rod 66 is pivotally connected. The upper end of the connecting rod 66 is pivotally connected at 67 to arm 68 of bell crank 69. The bell crank 69 is pivotally mounted on a shaft 70 which extends between the handles 60. The bell crank has an upwardly extending arm 71 at the top of which is a handle 71ª. A curved segment 79 having teeth 72 on its outer edge is firmly mounted on shaft 70 so that the teeth 72 will be engaged by a catch mechanism 73 which is mounted on the arm 71 of bell crank 69. The catch mechanism 73 comprises a rod 74 which extends from the handle 71ª downwardly and connects to a lever 75 pivotally mounted at 76 on the lever arm 71 and has a portion 77 adapted to engage the teeth 72. By downward movement of rod 74 the portion 77 of the lever 75 may be lifted from engagement with the teeth 72 which allows the bell crank 69 to be moved.

Movement of bell crank 69, due to its connection to slider 64 by means of connecting rod 66, causes movement of frame 10. When the lever arm 71 of the bell crank 69 is pulled toward the rear of the machine the frame 10 is raised relative to the frame 41 while if the lever arm 71 is moved forward the frame 10 is lowered. It will be readily understood how the catch mechanism 73 provides a means by which the bell crank 69 may be locked in any desired position thereby locking the frame 10 in any position relative to frame 41. If it is desired to have the frames free to move relative to each other the catch mechanism may be held out of engagement with the segment thereby allowing the frames to swing independent of each other. Due to the fact that the driving wheels 16 are carried by the frame 10 and that the cultivator teeth 50 are carried by the frame 41 it will be readily seen that the relative positions of the frames 41 and 10 will regulate the relative position of the driving wheels and the cultivator teeth. For instance, when the frames 41 and 10 are far apart, that is, when the frame 10 has been lifted upwardly away from frame 41 the cultivator teeth 50 are lowered into the ground, while when the frames 10 and 41 are closed together, that is, when the frame 10 is lowered the cultivator teeth 50 are lifted away from the ground and the driving wheels 16 only are in contact with the ground.

It will also be readily understood how the tendency for the teeth 50 to draw the frame 41 downward will cause the driving wheels 16 to be pulled downwardly against the ground, thereby greatly increasing the traction of the wheels. Generally speaking, the cultivator teeth are located under the driving wheels, so that their downward pulling action has the tendency to pull the wheels directly downwardly into good tractive engagement with the soil. But, in practice, we find it desirable to put the teeth somewhat rearwardly of the wheels to overcome the tendency that the machine would otherwise have of lowering its front end and nosing into the soil.

When we here speak of a traction wheel we do not mean to limit ourselves from other traction mechanisms that may be used in substitution for wheels.

In order to make the machine easy to guide a pilot wheel 80 may be attached to the forward end of the machine. The pilot wheel 80 is preferably an ordinary wheel carried in a frame 81 which frame is connected at 82 to frame 41. Side or balance wheels 85 may be mounted on the side members 42 of frame 41 in order to keep the machine from tipping from side to side. When a pilot wheel and balance wheels are used in connection with the machine it is not necessary to set or regulate the frames 10 and 41 relative to each other, as the pilot wheel, being mounted at the front of frame 41 is affected very little by movement of the frame and therefore, cooperates with the driving wheels so as to keep the frame 10 in a fixed position while the balance wheels prevent frame 41 from being drawn too close to the ground by the action of the teeth 50.

Having described a preferred form of our invention we do not wish to limit ourselves to the exact details hereinabove set forth but wish to reserve to ourselves any changes or modifications that may appear to those skilled in the art or fall within the scope of the following claim.

Having described a preferred form of our invention, we claim:

In a machine of the character described, a frame and a supporting and traction member by which the frame is supported and driven, and a plurality of soil engaging and disturbing members projecting diagonally downwardly and forwardly and adapted to enter the soil diagonally downwardly and forwardly so that their motion through the soil tends to pull them and the frame downwardly, and said members being located both forward and rearward of the engagement of said supporting and traction member with the soil so that their downward pulling action tends to press the member downwardly against the soil and to increase its effective traction and arranged so that their resultant downward pull is behind said point of ground engagement so that their resultant pull downwardly on the frame tends to tip the rear end of the frame down rather than to tip down the front end of the frame.

In witness that we claim the foregoing we have hereunto subscribed our names this 6th day of August, 1919.

JAMES R. STULL.
EUGENE D. BEDWELL.